United States Patent Office 3,357,749
Patented Dec. 12, 1967

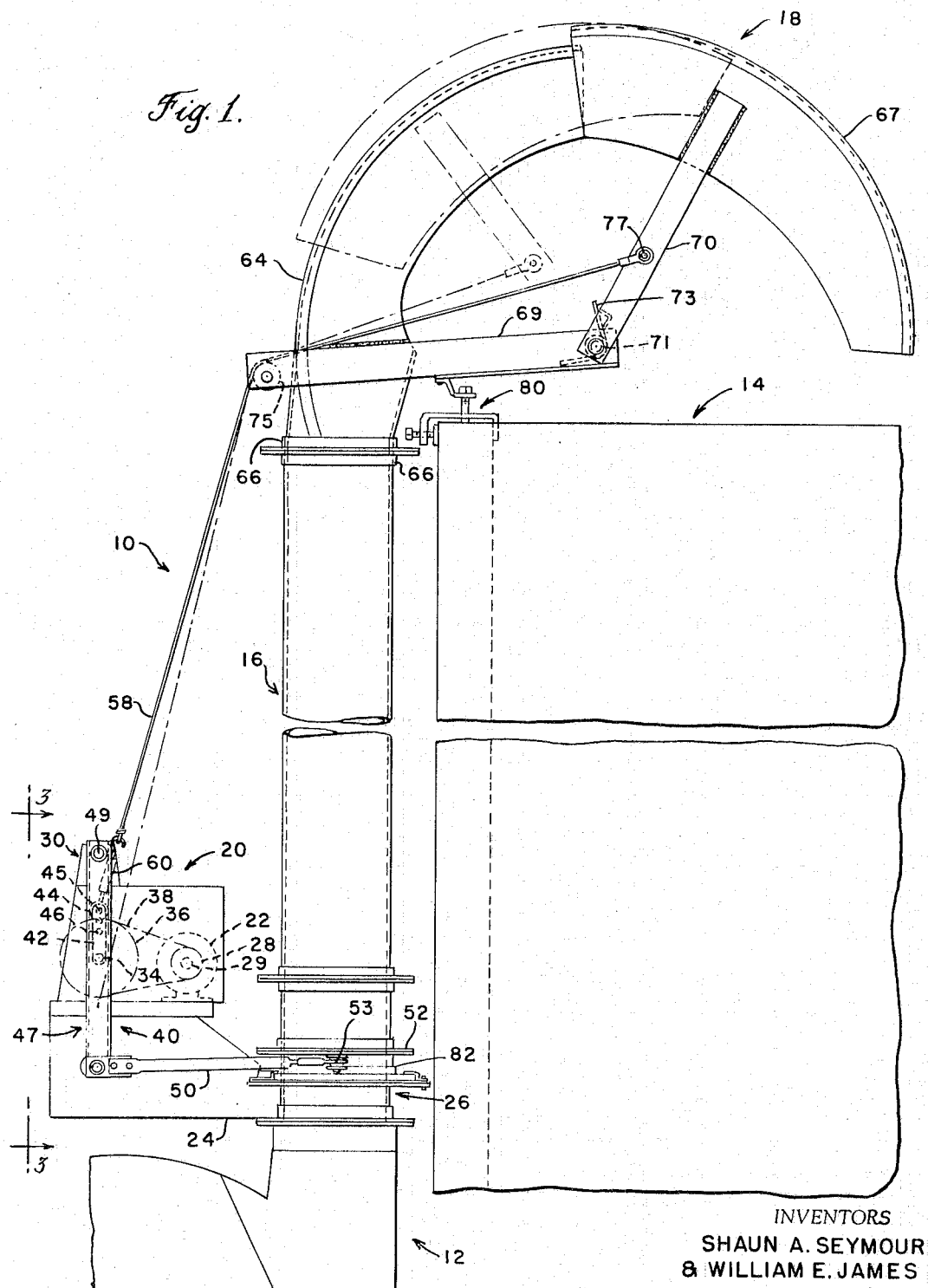

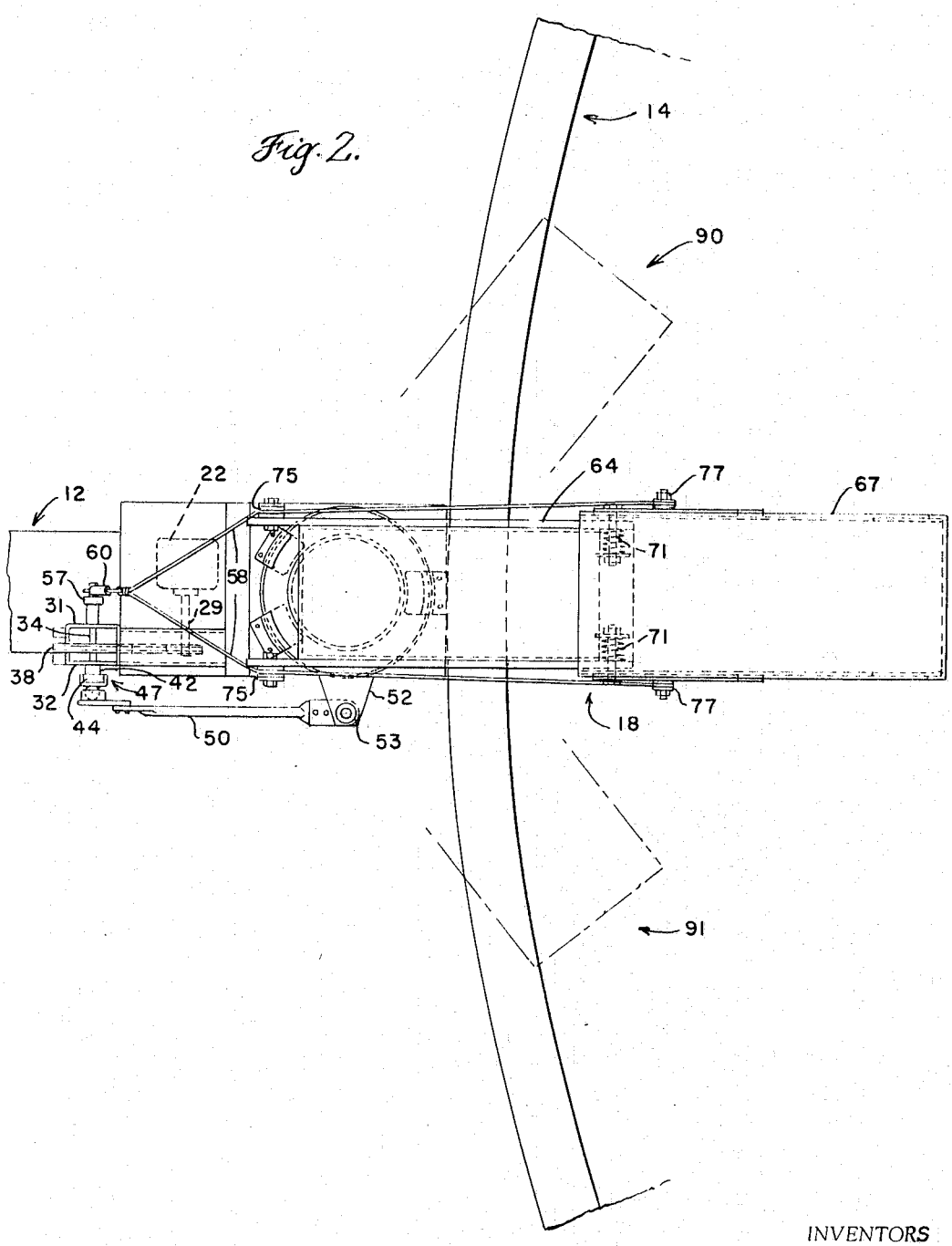

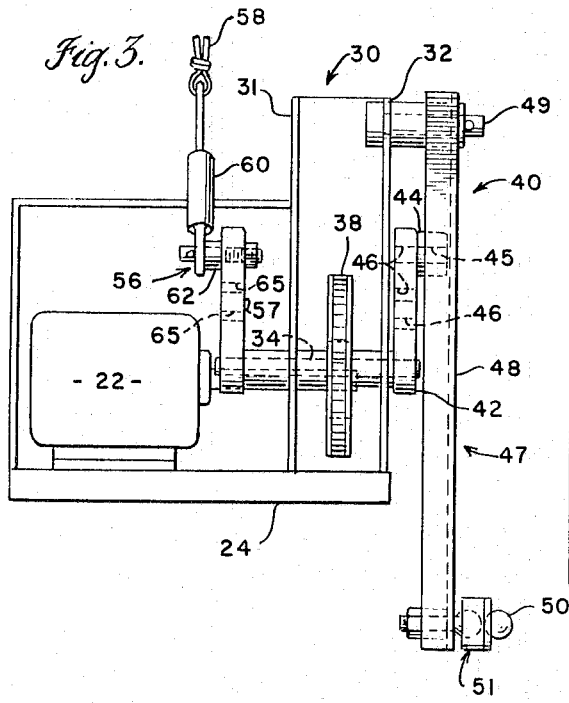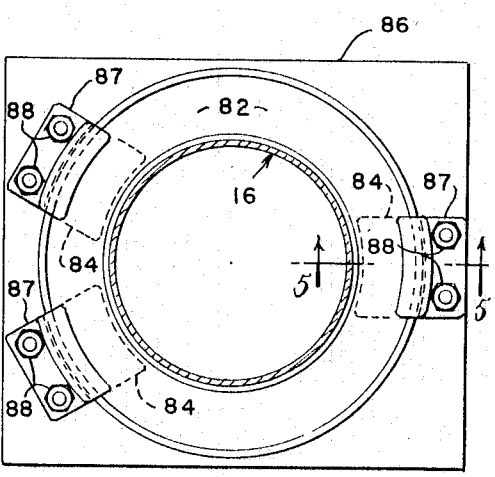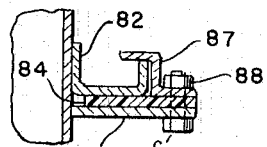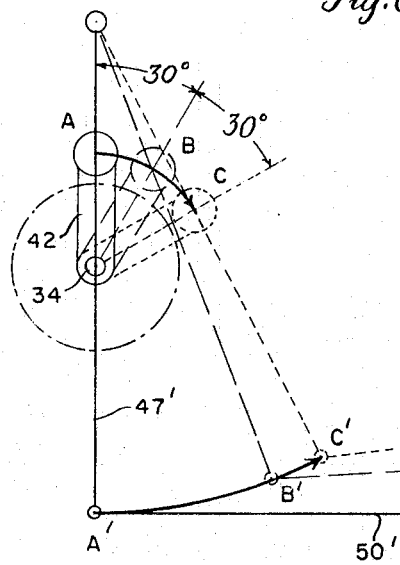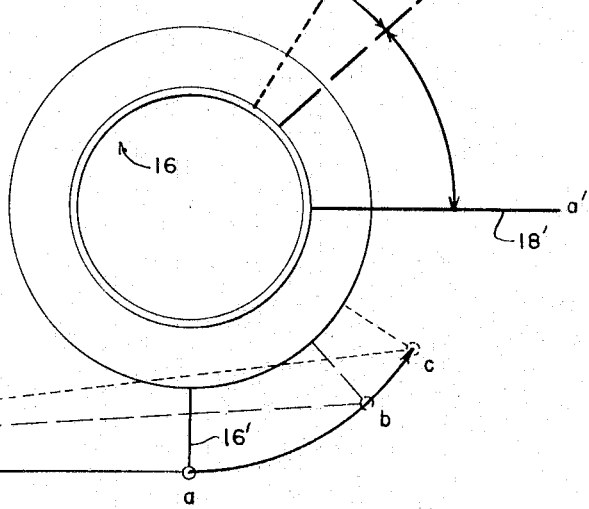
INVENTORS
SHAUN A. SEYMOUR
& WILLIAM E. JAMES
BY Donald D. Schaper
ATTORNEY INVENTORS
SHAUN A. SEYMOUR
& WILLIAM E. JAMES
BY Donald O. Schaper
ATTORNEY

3,357,749
SILAGE DISTRIBUTOR
Shaun A. Seymour, Ephrata, Pa., and William E. James, Dijon, France, assignors to Sperry Rand Corporation, New Holland, Pa., a corporation of Delaware
Filed May 25, 1966, Ser. No. 552,810
10 Claims. (Cl. 302—60)

ABSTRACT OF THE DISCLOSURE

A silage distributor having a drive system for oscillating the discharge chute about a vertical axis at variable rates of speed.

---

This invention relates to a silage distributor, and more particularly, to an improved drive mechanism for a silage distributor.

In one type of silage distributor, the discharge chute is mounted adjacent the silo wall, and means are provided for oscillating the chute at a constant speed about a vertical axis and pivoting the chute about a horizontal axis to distribute the silage over the cross-sectional area of the silo. The resulting distribution from this type of distributor, however, tends to be uneven, since the area covered in one direction of the chute's oscillatory movement is greater than the area covered in the other direction of oscillatory movement. The effects of unevenly filled silos—silo wall rupture and spoilage of the silage, are well known to persons in the art.

One object of this invention is to provide a drive mechanism in a silage distributor of the type described which will provide for an even distribution of the silage over the entire cross-sectional area of the silo.

Another object of this invention is to provide a drive means for a silage distributor which will oscillate the discharge chute relatively fast in one direction and relatively slow in an opposite direction.

A further object of this invention is to provide a drive means for a silo distributor which can be adjusted to accommodate various sizes of silos.

A still further object of this invention is to provide a novel bearing means for the feed conduit of the silage distributor.

Other objects of this invention will be apparent hereinafter from the specification and from the recital in the appended claims.

In the drawings:

FIG. 1 is an elevational view, partly broken away, and showing the silage distributor with the feed conduit alongside a broken out fragment of the silo.

FIG. 2 is a plan view of FIG. 1, and shows the two extreme positions of the discharge chute in dot-and-dash lines;

FIG. 3 is an end view, on an enlarged scale, looking in the direction of arrows 3—3 in FIG. 1;

FIG. 4 is a plan view showing the hold down clamps and wear strips;

FIG. 5 is a section on the line 5—5 of FIG. 4; and

FIGS. 6–8 are diagrams indicating schematically the conduit oscillating means and showing the positions of the various components during one cycle of operation.

Figure 7:
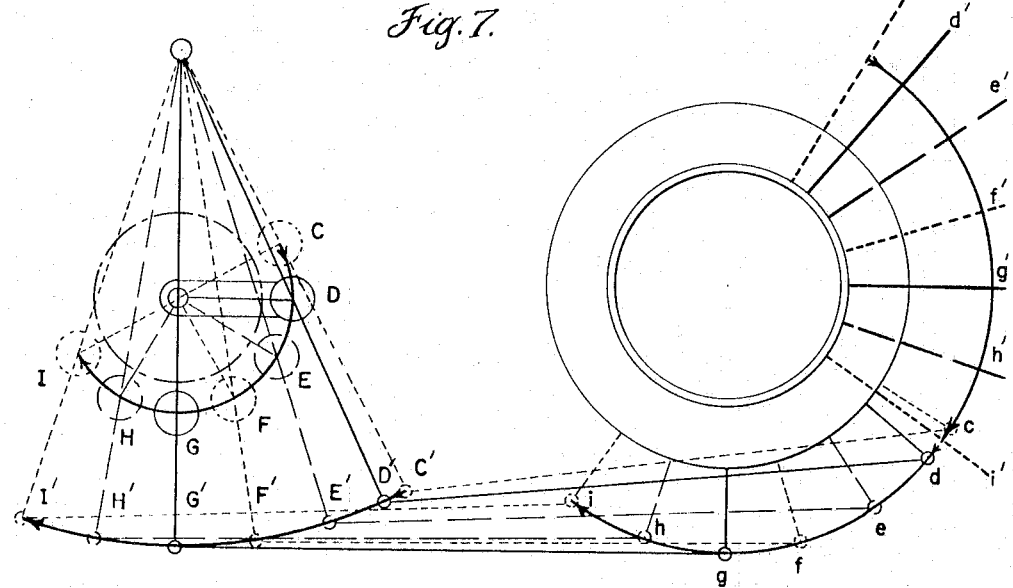

Referring now to the drawings by numerals of reference and particularly to FIG. 1, 10 denotes generally the silage distributor which is connected to a forage blower 12 and mounted on a side wall of a silo 14. Silage is delivered through a feed conduit 16 and is discharged to the silo through chute 18. A drive means 20 located near the source of silage furnishes power to the means for oscillating conduit 16 and the means for pivoting chute 18.

With reference to FIGS. 1 and 3, drive means 20 comprises a motor 22 mounted on support stand 24 which extends from a pipe 26 on blower 12. A sprocket 28 is fixed to motor shaft 29 for transmitting power from motor 22. A U-shaped bracket 30 having a pair of legs 31 and 32 extends upwardly from support stand 24. A shaft 34 having a sprocket 36 attached thereon is journalled in legs 31 and 32, and is operatively connected to sprocket 28 by a drive chain 38.

Oscillating means 40 for feed conduit 16 comprises a first link 42 fixed to shaft 34, a roller 44 having a pin 45 fixed thereto which is received in one of the three holes 46 in link 42, and a second link 47 having a channel body section 48 for receiving roller 44. Second link 47 is pivotally connected at its upper end to leg 32 by a pin 49 and pivotally connected at its lower end to a connecting rod 50 through a ball-and-socket connection 51. Connecting rod 50 is fixed to collar 52 on feed conduit 16 by connecting means 53.

A pivoting means 56 for chute 18 comprises a crank 57 fixed to shaft 34 and cables 58—58 connected to the radially outward end of crank 57 through a turnbuckle 60. A pin 62 connects turnbuckle 60 to crank 57; pin 62 can be inserted in any of the holes 65 to vary the stroke of cables 58.

Chute 18, as shown in FIGS. 1 and 2, comprises a fixed chute portion 64 having a collar 66 thereon which is slidably received on the upper end of feed conduit 16, and a movable chute portion 67. A pair of generally horizontal cross members 69—69 extend outwardly from fixed chute portion 66, and a pair of generally vertical elements 70—70 fixed to opposite sides of movable chute portion 67 are pivotally connected to cross members 69 by pins 71. A pair of conventional coil-type springs 73 are fixed to cross members 69 and elements 70 to bias movable chute portion 67 outwardly into the solid-line position shown in FIG. 1. Cables 58 extend around rollers 75 on cross members 69 and are fixed to elements 70 by bolts 77. A clamp 80 extends from cross members 69 and is adapted to be secured to the silo wall to support the distributor at its upper end.

Feed conduit 16 is supported for oscillation by a radially extending flange 82 which bears against wear strips 84 on collar 86 of the blower pipe 26 (see FIGS. 4 and 5). Hold down clamps 87 prevent misalignment of conduit 16, and bolts 88 secure the clamps 87 and wear strips 84 to collar 86.

An important feature of this invention is the means provided for oscillating the feed conduit at a first rate in one direction of its oscillatory movement and at a faster rate relative to the first rate in the other direction of its oscillatory movement. With reference to FIGURE 2, movable chute portion 67 would be progressively raised as it moves from the position shown at 90 to the position shown in solid lines; and as chute portion 67 moves from the solid-line position to position 91, chute portion 67 would be progressively lowered and the chute would remain in a lowered position as it is returned from position 91 to position 90. From the foregoing, it is seen that a substantially greater area of the silo must be covered as the chute moves from position 90 to position 91 than when it moves from 91 to 90; thus, to get an even distribution of the silage, the chute must move at a slower rate in going from position 90 to position 91 than it does in going from position 91 to position 90. The desired fast-slow movement is accomplished by the disclosed oscillating means.

Figure 8:
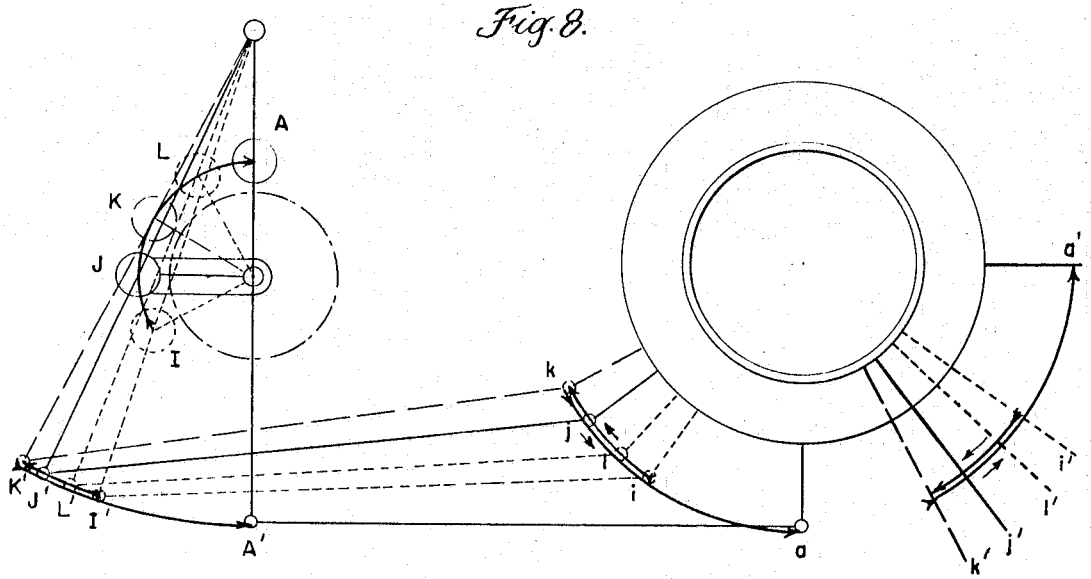

The oscillating means 40 for feed conduit 16 is shown schematically in FIGURES 6–8. The corresponding movements of link 47, conduit 16, and chute 18 are shown for one revolution of link 42. With reference to FIGURE 6, link 47, connecting rod 50, conduit 16, and chute 18 are indicated diagrammatically in their starting positions by line 47′, line 50′, line 16′ and line 18′ respectively. As link 42 passes through positions A through L, link 47 moves through positions A′ through L′, conduit 16 moves through positions a through l, and chute 18 moves through positions a′ through l′. As link 42 moves from K to C (one hundred twenty degrees) chute 18 is oscillated in one direction; and as link 42 moves from C to K (two hundred forty degrees) chute 18 is oscillated in the opposite direction. Thus, since link 42 is rotating at a constant speed, it will be seen that chute 18 moves twice as fast in the one direction as it does in the opposite direction.

In operation, motor 22 serves to rotate shaft 34 through drive chain 38. Link 42, fixed to rotating shaft 34, oscillates second link 47 by means of roller 44 acting in the channel body section 48 of the second link. The oscillatory movement of link 47 is transmitted to feed conduit 16 through connecting rod 50. As feed conduit 16 oscillates, chute 18 is moved between positions shown at 90 and 91 in FIG. 2; as described above, chute 18 moves relatively slow from 90 to 91 and relatively fast from 91 to 90. Simultaneously with the oscillation of feed conduit 16, movable chute portion 67, as shown in FIG. 1, is progressively pivoted between the position shown in solid lines to direct silage along the side of the silo adjacent the feed conduit and the position shown in dot-and-dash lines to direct silage to the opposite side of the silo. The pivoting of movable chute portion 67 is accomplished by rotating crank 57 which pulls on cables 58—58.

The combination of oscillatory and pivoting movements imparted to chute portion 67 causes the silage to be distributed in a closed curve approaching the circular shape of the silo. The area encompassed by the closed curve can be changed by varying the arc through which chute portion 67 is pivoted and the arc through which conduit 16 is oscillated. The arc of conduit 16 can be changed by inserting pin 45 in a different hole 46 in link 42, and the arc through which chute portion 67 is pivoted can be changed by inserting pin 62 in a different hole 65 in crank 57.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A silage distributor comprising in combination an elongated feed conduit adapted to extend vertically alongside a silo and having a lower end adjacent ground level through which feed material is received from a forage blower or other mechanism and an upper end adjacent the top of the silo, a chute carried on said conduit at the upper end thereof for directing feed material from said conduit into said silo, drive means for oscillating said conduit and the chute thereon about a vertical axis, said drive means moving said chute in a first direction from one side of the silo to the other side and in a second direction opposite to said first direction, means for oscillating said chute about a horizontal axis to change the vertical position of said chute as it is being oscillated so that said material is distributed in a closed curve around the periphery of the silo, said material being distributed in a first portion of said curve when said chute is oscillated in said first direction and in a second portion of said curve when said chute is oscillated in said second direction, said first portion of the curve being substantially longer than said second portion of the curve, said first portion of the curve being opposite said conduit and said second portion being adjacent said conduit, said drive means oscillating said chute at a first rate of speed in said first direction and at a faster rate of speed relative to said first rate in said second direction, and said rates of speed being proportional to the lengths of said curve portions.

2. A silage distributor comprising in combination an elongated feed conduit adapted to extend vertically along a side wall portion of a silo and having a lower end adjacent ground level through which feed material is received from a forage blower or other mechanism and an upper end adjacent an inlet into the silo, chute means at the upper end of said conduit, said chute means having a discharge end portion through which material is directed generally downwardly into the interior of said silo from adjacent said side wall portion, drive means for oscillating said conduit and the chute means thereon about a vertical axis, said drive means moving said chute means in a first direction from one side of the silo to the other side and in a second direction opposite to said first direction, means for changing the vertical position of said discharge end portion of the chute means as it is being oscillated so that said material is distributed in a closed curve around the periphery of the silo, said material being distributed in a first portion of said curve when said chute means is oscillated in said first direction and in a second portion of said curve when said chute means is oscillated in said second direction, said first portion of the curve being substantially longer than said second portion of the curve, said first portion of the curve being opposite said conduit and said second portion being adjacent said conduit, said drive means oscillating said chute means at a first rate of speed in said first direction and at a faster rate of speed relative to said first rate in said second direction, and said rates of speed being proportional to the lengths of said curve portions.

3. A silage distributor, as recited in claim 2, wherein said drive means comprises a first link adapted to be rotated at a constant speed, a pivotally mounted second link operatively connected to said first link, and a connecting rod extending between said second link and said feed conduit.

4. A silage distributor, as recited in claim 3, wherein a support stand is provided adjacent a lower end of said conduit, a drive shaft is journalled in a vertically extending bracket on said support stand, said first link is fixed on said drive shaft for rotation therewith, said second link is pivotally mounted on said bracket at one end and pivotally connected to said connecting rod at its other end, and as said first link rotates said second link is oscillated to reciprocate said connecting rod and oscillate said conduit.

5. A silage distributor, as recited in claim 4, wherein said second link is formed in the shape of channel, a roller is rotatably mounted on said first link, and said roller is received in said channel.

6. A silage distributor, as recited in claim 2, wherein means is provided for pivoting said discharge end portion of said chute means about a generally horizontal axis and in timed relationship to said drive means.

7. A silage distributor, as recited in claim 6, wherein said means for pivoting said end portion comprises a crank mounted for rotation about a horizontal axis and a cable connected to said crank.

8. A silage distributor, as recited in claim 2, wherein said chute means comprises a fixed chute portion mounted on said feed conduit and said discharge end portion is movable relative thereto, a pair of generally horizontal cross members extend from opposite sides of said fixed chute portion, a pair of elements are fixed to opposite sides of said discharge end portion and extend generally vertically, said elements are pivotally connected to said cross members, and spring means extends between said cross members and said elements to bias said end portion in one direction.

9. A silage distributor, as recited in claim 6, wherein a support stand is provided for a driving motor adjacent a lower end of said feed conduit, a drive shaft is journalled in a vertically extending bracket on said support stand, said drive shaft extends between said drive means and said means for pivoting said discharge end portion, and an endless member operatively connects said drive shaft to said motor for rotation thereby.

10. A silage distributor, as recited in claim 2, wherein a pipe extends upwardly from said source of silage, a collar extends around said pipe at an upper end, a series of wear strips are fixed to and circumferentially spaced on said collar, and said feed conduit is supported for oscillation on said wear strips.

References Cited

UNITED STATES PATENTS

| | | | |
|---|---|---|---|
| 782,444 | 2/1905 | Gibbons | 302—60 |
| 1,655,151 | 1/1928 | Lund | 74—48 |
| 1,732,475 | 10/1929 | Kenyon | 74—48 |
| 2,257,572 | 9/1941 | Radue | 302—60 |
| 2,650,136 | 8/1953 | Raleigh | 302—60 |
| 3,075,813 | 1/1963 | Vohl | 302—61 |
| 3,105,722 | 10/1963 | Thompson | 302—60 |

FOREIGN PATENTS 634,485    2/1962    Italy.

EVON C. BLUNK, *Primary Examiner.*

M. L. AJEMAN, *Assistant Examiner.*